United States Patent
Shakudo (10) Patent No.: US 11,531,359 B2
(45) Date of Patent: Dec. 20, 2022

(54) FLUID CONTROL APPARATUS, FLUID CONTROL METHOD, AND PROGRAM RECORDING MEDIUM IN WHICH PROGRAM FOR FLUID CONTROL APPARATUS IS RECORDED

(71) Applicant: HORIBA STEC, Co., Ltd., Kyoto (JP)

(72) Inventor: Kazuya Shakudo, Kyoto (JP)

(73) Assignee: HORIBA STEC, Co., Ltd., Kyoto (JP)

( * ) Notice: Subject to any disclaimer, the term of this patent is extended or adjusted under 35 U.S.C. 154(b) by 0 days.

(21) Appl. No.: 17/454,508

(22) Filed: Nov. 11, 2021

(65) Prior Publication Data

US 2022/0163983 A1    May 26, 2022

(30) Foreign Application Priority Data

Nov. 24, 2020   (JP) .............................. JP2020-194363

(51) Int. Cl.
```
G05D 7/06      (2006.01)
F16K 31/00     (2006.01)
F16K 37/00     (2006.01)
G05B 11/36     (2006.01)
G01F 1/684     (2006.01)
```

(52) U.S. Cl.
CPC .......... *G05D 7/0623* (2013.01); *F16K 31/007* (2013.01); *F16K 37/005* (2013.01); *F16K 37/0083* (2013.01); *G05B 11/36* (2013.01); *G05D 7/0635* (2013.01); *G01F 1/6847* (2013.01); *Y10T 137/7761* (2015.04)

(58) Field of Classification Search
CPC ............ Y10T 137/7761; G05D 7/0623; G05D 16/202; G05D 16/2022; F16K 31/007; F16K 37/005; F16K 37/0083; G01F 1/6847; G05B 11/36

USPC ...................................................... 137/487.5
See application file for complete search history.

(56) References Cited

U.S. PATENT DOCUMENTS

| | | | | |
|---|---|---|---|---|
| 4,017,056 A | * | 4/1977 | Schwalenstocker | .... F01D 17/24 91/363 R |
| 4,361,164 A | * | 11/1982 | Sakakibara | ............... H01F 7/13 137/487.5 |
| 4,766,921 A | * | 8/1988 | Williams | ............. G05D 7/0635 251/129.08 |

(Continued)

FOREIGN PATENT DOCUMENTS

JP         6279675 B2    2/2018

*Primary Examiner* — William M McCalister
(74) *Attorney, Agent, or Firm* — Alleman Hall Creasman & Tuttle LLP (57) ABSTRACT

Provided is a fluid control apparatus capable of setting, to a value as close as possible to an opening start voltage, an initial applied voltage applied when controlling a control valve so that a measured amount becomes a set amount from a fully closed state and capable of preventing occurrence of large overshoot while increasing a response speed. A valve controller inputs a voltage command for setting an initial driving voltage to be applied to a control valve to a voltage generation circuit in a case where the control valve is changed from a fully closed state to a predetermined opening degree, and includes a drive history storage unit that stores therein drive history information of the control valve. The controller is configured to change a value of the initial driving voltage in accordance with the drive history information.

11 Claims, 10 Drawing Sheets

(56) References Cited

U.S. PATENT DOCUMENTS

| | | | | |
|---|---|---|---|---|
| 5,335,565 | A * | 8/1994 | Ito | F16H 61/0021 |
| | | | | 251/129.08 |
| 6,388,497 | B1 * | 5/2002 | Kirschner | H03K 17/24 |
| | | | | 327/332 |
| 7,000,893 | B2 * | 2/2006 | Yakushi | F15B 9/09 |
| | | | | 251/25 |
| 10,711,913 | B2 * | 7/2020 | Schneider | F16K 31/0675 |
| 2012/0247584 | A1 * | 10/2012 | Goto | G05D 7/0635 |
| | | | | 137/487.5 |
| 2013/0037112 | A1 * | 2/2013 | Smirnov | G05D 7/0635 |
| | | | | 137/1 |
| 2018/0275689 | A1 * | 9/2018 | Sonoda | G01F 1/00 |

* cited by examiner

FLUID CONTROL APPARATUS, FLUID CONTROL METHOD, AND PROGRAM RECORDING MEDIUM IN WHICH PROGRAM FOR FLUID CONTROL APPARATUS IS RECORDED

BACKGROUND

Technical Field

The present invention relates to a fluid control apparatus used for controlling flow rates, pressures, and the like of various gases used in, for example, a semiconductor manufacturing process to desired set amounts.

Related Art

This type of fluid control apparatus includes a flow rate sensor provided on a flow path through which fluid flows, a control valve, and a flow rate controller that feedback-controls the control valve so that a measured flow rate of the flow rate sensor becomes a set flow rate.

When starting to control the fully closed state control valve to another opening degree so that the flow rate becomes a set flow rate other than zero, it may take time until the measured flow rate converges to the set flow rate if the feedback control as described above is performed from the beginning.

This is because, in the case of a normally closed type control valve, a valve body of the control valve does not start to open away from a valve seat unless a voltage exceeding an opening start voltage is applied to the control valve. That is, when the control valve in the fully closed state is subjected to feedback control based on a deviation between the measured flow rate and the set flow rate from the beginning, an applied voltage set in initial plural control cycles cannot exceed the opening start voltage, and accordingly time is wasted until the valve starts to open.

In view of this, in Japanese Patent No. 6279675, in a case where flow rate control is started from a fully closed state, a value of an initially set initial applied voltage is set to, for example, a value larger than an opening start voltage, and thereafter, flow rate feedback control is started.

In a case where the initial applied voltage is set to a value larger than the opening start voltage, a measured flow rate may overshoot largely with respect to a set flow rate. Therefore, by multiplying the opening start voltage by a predetermined safety factor, a voltage smaller than the opening start voltage is set as an initial applied voltage so that overshoot of a predetermined amount or more does not occur.

PRIOR ART DOCUMENT

Patent Document

Patent Document 1: Japanese Patent No. 6279675

SUMMARY

However, in a case where the initial applied voltage is set to a value close to the opening start voltage, the opening start voltage may change for some reason, and as a result, an overshoot that has not occurred at the beginning may occur. In order to prevent such a problem from occurring, it is conceivable to increase the safety factor, but in this case, for example, a response speed of a rise of the flow rate decreases.

The present invention has been made to solve the above problems, and it is an object of the present invention to provide a fluid control apparatus capable of setting, to a value as close as possible to an opening start voltage, an initial applied voltage applied when controlling a control valve so that a measured amount becomes a set amount from a fully closed state and capable of preventing occurrence of large overshoot and the like while increasing a response speed.

That is, as a result of diligent studies, the inventor of the present application found that a change in the opening starting voltage is caused by fatigue in the control valve. The present invention has been made based on this finding.

Specifically, a fluid control apparatus according to the present invention includes a control valve that is provided on a flow path and whose opening degree is changed in accordance with an applied voltage; a fluid sensor that measures a flow rate or a pressure of a fluid flowing through the flow path; a voltage generation circuit that outputs a voltage according to an input voltage command to the control valve; and a valve controller that controls the control valve so as to reduce a deviation between a measured amount measured by the fluid sensor and a set amount, wherein the valve controller includes an initial driving voltage setting unit that inputs a voltage command for setting an initial driving voltage to be applied to the control valve to the voltage generation circuit in a case where the control valve is changed from a fully closed state to a predetermined opening degree, and a drive history storage unit that stores therein drive history information of the control valve, and the initial driving voltage setting unit changes a value of the initial driving voltage in accordance with the drive history information.

A method according to the present invention is a method for controlling a fluid control apparatus including a control valve that is provided on a flow path and whose opening degree is changed in accordance with an applied voltage, a fluid sensor that measures a flow rate or a pressure of a fluid flowing through the flow path, and a voltage generation circuit that outputs a voltage according to an input voltage command to the control valve, the method including inputting a voltage command for setting an initial driving voltage to be applied to the control valve to the voltage generation circuit in a case where the control valve is changed from a fully closed state to a predetermined opening degree and controlling the control valve so as to reduce a deviation between a measured amount measured by the fluid sensor and a set amount by outputting a voltage to the control valve, wherein a value of the initial driving voltage is changed in accordance with drive history information of the control valve.

With such a configuration, a degree of fatigue of the control valve can be grasped based on the drive history information. Therefore, the initial driving voltage can be changed in accordance with a change in the opening start voltage caused by fatigue, and therefore it is not necessary to set a safety factor high unlike the conventional art. Therefore, it is possible to realize ideal responsiveness so that an extreme overshoot or the like does not occur while shortening a time required until the measured amount matches the set amount.

In order to keep substantially the same responsiveness by changing the initial driving voltage in accordance with progress of fatigue of the control valve, the fluid control apparatus may be configured such that the control valve is a normally closed valve that is in a fully closed state in a state where no voltage is applied; the drive history information includes the number of times of opening and closing of the control valve; and the initial driving voltage setting unit is configured to lower the initial driving voltage in accordance with the number of times of opening and closing of the control valve.

In order to keep responsiveness constant by preventing the initial driving voltage from changing after the control valve reaches a fatigue limit and the opening start voltage no longer changes due to fatigue, the initial driving voltage setting unit may set the initial driving voltage to a predetermined fixed value when the number of times of opening and closing of the control valve is a predetermined value or more.

For example, in order to obtain desired control performance when the set amount is changed while preventing a large overshoot from occurring, the initial driving voltage may be set to a value lower than an opening start voltage at which the control valve starts to open from a fully closed state.

Another aspect of the fluid control apparatus according to the present invention may be configured such that the control valve is a normally open valve that is in a fully open state in a state where no voltage is applied; the drive history information includes the number of times of opening and closing of the control valve; and the initial driving voltage setting unit is configured to increase or decrease the initial driving voltage in accordance with the number of times of opening and closing of the control valve.

As a result of studies, the present inventor found that a factor that greatly affects a change in the opening start voltage caused by fatigue is a method for processing a diaphragm used in the control valve. In order to set the initial driving voltage to an appropriate value by reflecting a change in the opening start voltage due to such a difference in the diaphragm, the fluid control apparatus may be configured such that the control valve includes a diaphragm formed by either cutting or drawing; and the initial driving voltage setting unit varies a change amount of the initial driving voltage with respect to the number of times of opening and closing in accordance with a processing method used to form the diaphragm.

In order to start feedback control based on a set amount and a measured amount after the initial driving voltage is input to the voltage generation circuit, the fluid control apparatus may be configured such that the valve controller further includes a feedback control unit that calculates a voltage command to be input to the voltage generation circuit based on a deviation between the set amount and the measured amount; and the voltage command calculated by the feedback control unit is input to the voltage generation circuit after the initial driving voltage is input to the control valve.

In a case where the control valve is configured such that an upper limit value of a voltage that can be output is changed in accordance with a usage environment temperature of the control valve, a flow rate and a pressure realized at, for example, a maximum opening degree can be maintained at the same value even if thermal expansion occurs in a component such as a valve body constituting the control valve.

As a result of studies, the present inventor found that the opening start voltage is influenced by the usage environment temperature in addition to the fatigue. In order to further improve responsiveness by reflecting such a temperature influence in the initial driving voltage, the valve controller may further include a temperature correction unit that corrects the initial driving voltage in accordance with a usage environment temperature of the control valve.

In order to achieve the same effects as the fluid control apparatus according to the present invention, for example, by updating a program in an existing fluid control apparatus, a program used for a fluid control apparatus including a control valve that is provided on a flow path and whose opening degree is changed in accordance with an applied voltage, a fluid sensor that measures a flow rate or a pressure of a fluid flowing through the flow path, and a voltage generation circuit that outputs a voltage according to an input voltage command to the control valve may be used, wherein the program causes a computer to function as a valve controller that controls the control valve so as to reduce a deviation between a measured amount measured by the fluid sensor and a set amount, the valve controller includes an initial driving voltage setting unit that inputs a voltage command for setting an initial driving voltage to be applied to the control valve to the voltage generation circuit in a case where the control valve is changed from a fully closed state to a predetermined opening degree, and a drive history storage unit that stores therein drive history information of the control valve, and the initial driving voltage setting unit changes a value of the initial driving voltage in accordance with the drive history information.

Note that the program may be distributed electronically or may be recorded in a program recording medium such as a CD, a DVD, or a flash memory.

As described above, according to the fluid control apparatus according to the present invention, the initial driving voltage can be set to an appropriate value in accordance with a change in the opening start voltage caused by influence of fatigue in the control valve. Therefore, it is possible to keep a state in which a large overshoot or the like does not occur while shortening a time taken for the measured amount to follow the set amount.

DETAILED DESCRIPTION

A fluid control apparatus 100 according to a first embodiment of the present invention will be described with reference to FIGS. 1 to 8(a) and 8(b).

The fluid control apparatus 100 is, for example, a flow rate control apparatus used for controlling flow rates of various gases supplied into a chamber in a semiconductor manufacturing process. Specifically, the fluid control apparatus 100 is a mass flow controller and is attached to a pipe connected to the chamber.

Figure 1:
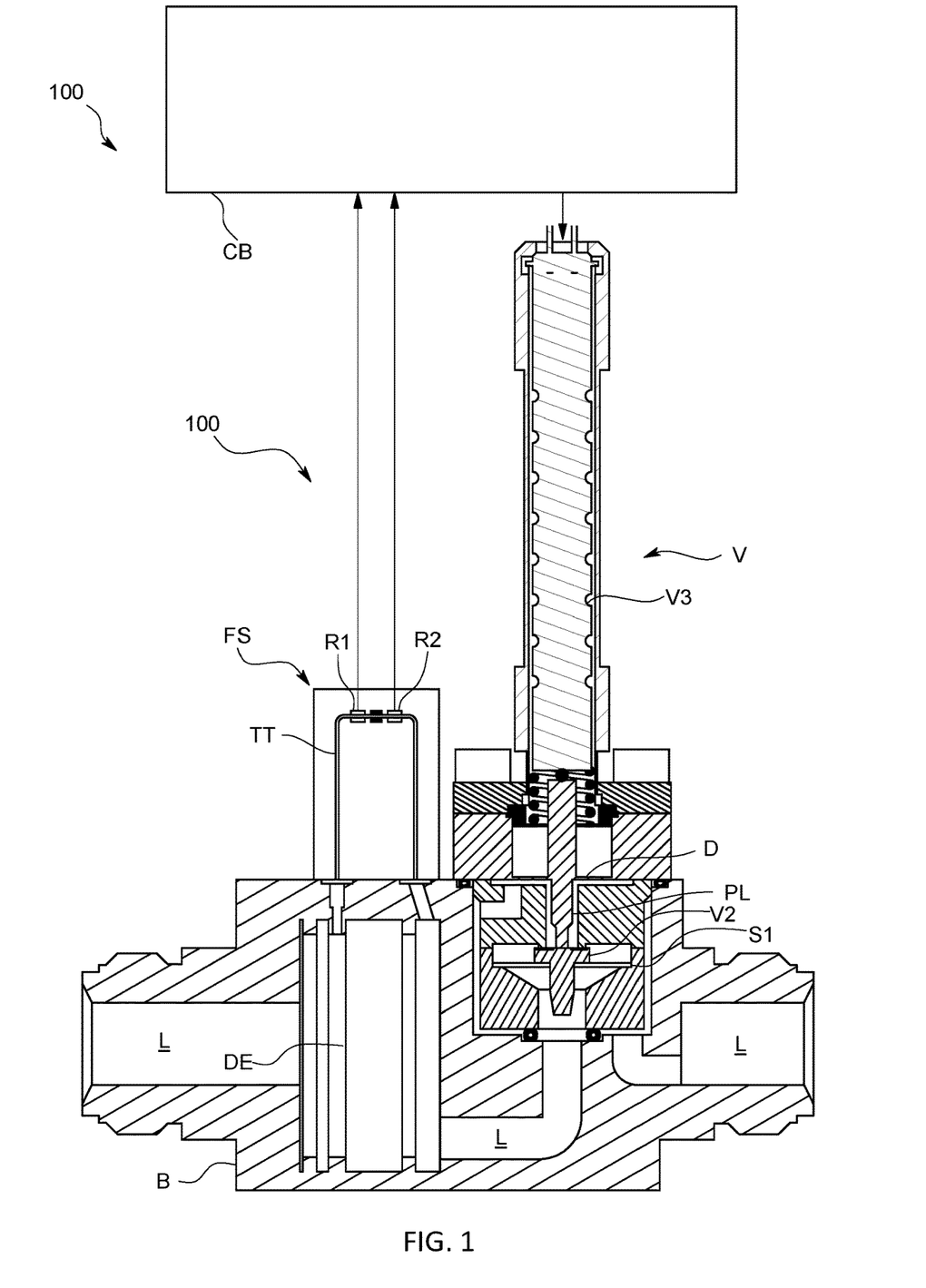
FIG. 1 is a schematic view illustrating a flow rate control apparatus according to a first embodiment of the present invention.

As illustrated in FIG. 1, the fluid control apparatus 100 includes a body B in which a flow path L through which a fluid flows is provided, a thermal type flow rate sensor FS that is a fluid sensor provided on the flow path L, a control valve V provided on a downstream side of the flow rate sensor FS, and a control board CB that controls the control valve V so that a measured flow rate that is a measured amount of the flow rate sensor FS matches a set flow rate that is a set amount set by a user.

Figure 3:
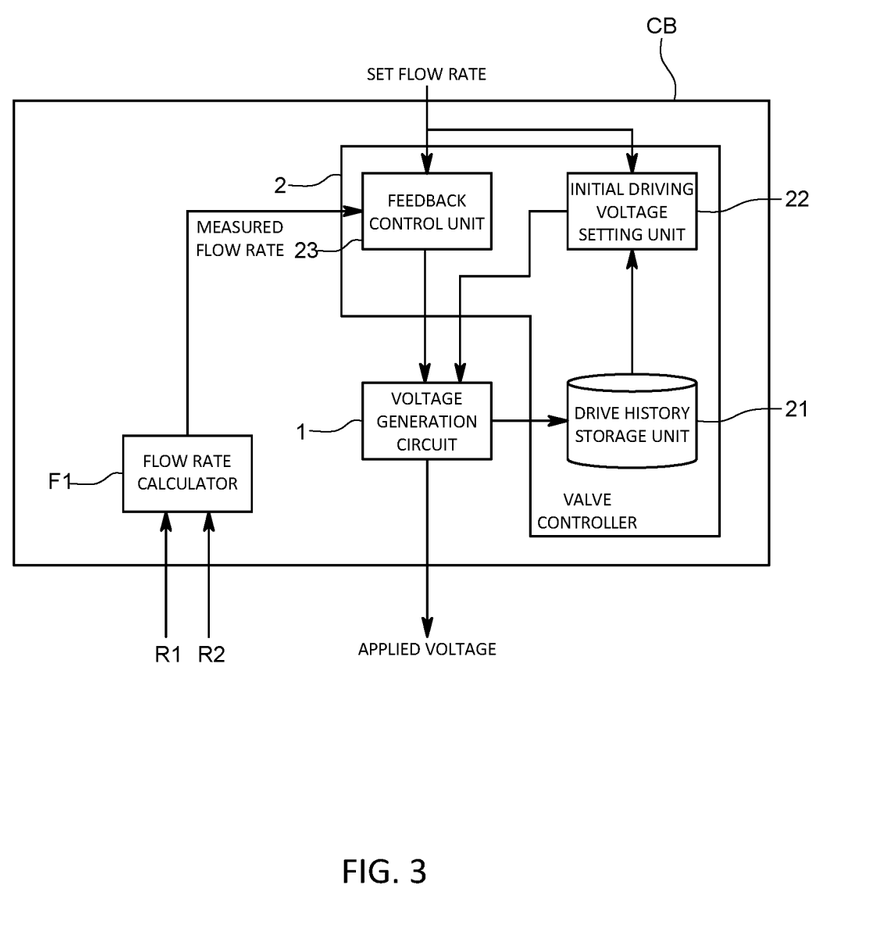
FIG. 3 is a functional block diagram of units realized by a control board according to the first embodiment.

As illustrated in FIGS. 1 and 3, the flow rate sensor FS includes a flow dividing element DE that is a fluid resistance, a U-shaped narrow tube TT that branches from an upstream side of the flow dividing element DE and joins a downstream side of the flow dividing element DE, a first resistance element R1 wound around an outer surface of the narrow tube TT, a second resistance element R2 wound around an outer surface of the narrow tube TT on a downstream side of the first resistance element R1, and a flow rate calculator F1. In the present embodiment, the flow rate calculator F1 is realized by using a calculation function of the control board CB and a temperature control circuit (not illustrated). The temperature control circuit applies voltages to the first resistance element R1 and the second resistance element R2 so that the first resistance element R1 and the second resistance element R2 are maintained at a predetermined temperature higher than an ambient environment temperature. The flow rate calculator F1 calculates a flow rate based on an existing flow rate calculation formula based on the voltages applied to the resistance elements R1 and R2. The flow rate sensor FS is not limited to the thermal type and can be one based on any of various measurement principles such as a pressure type and an ultrasonic type. In the case of the pressure type flow rate sensor, a fluid resistance provided instead of the flow dividing element DE may be a laminar flow element, an orifice plate, or the like. In short, it is only necessary to provide pressure sensors on an upstream side and a downstream side of the fluid resistance that generates a differential pressure necessary for calculating a flow rate based on a pressure.

Figure 2:
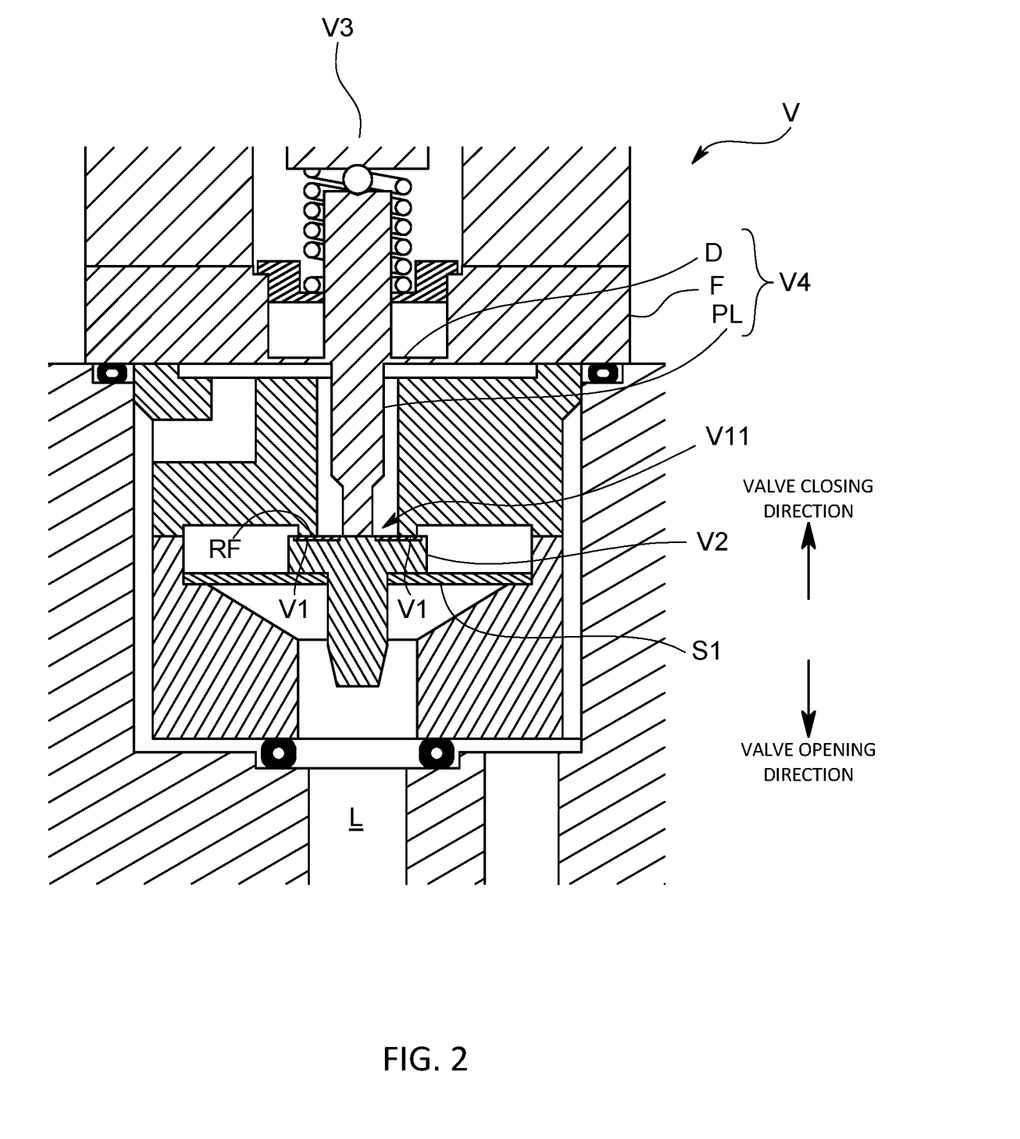
FIG. 2 is a schematic cross-sectional view illustrating a configuration of a control valve in the flow rate control apparatus according to the first embodiment.

As illustrated in FIGS. 1 and 2, the control valve V includes a valve seat V1 having an opening V11 through which fluid flowing from the flow path L flows out, a valve body V2 that is provided so as to be able to contact and separate from the valve seat V1 provided on an upper side thereof and opens and closes the opening of the valve seat V1, a piezo actuator V3 that causes the valve body V2 to contact and separate from the valve seat V1, and a coupling mechanism V4 provided between the valve body V2 and the piezo actuator V3.

The valve body V2 is biased toward the valve seat V1 by a leaf spring 51 provided on a lower side thereof, and the valve body V2 closes the opening of the valve seat V1 when no voltage is applied to the piezo actuator V3. That is, the control valve V is a normally closed type control valve that is in a fully closed state in a state where no voltage is applied. The valve body V2 has a resin film RF having a predetermined thickness on an annular region that makes contact with the valve seat V1.

The coupling mechanism V4 includes a substantially cylindrical plunger PL that connects the piezo actuator V3 and the valve body V2, a diaphragm D that is a thin film-like portion extending radially outward from a central portion, in a longitudinal direction, of the plunger PL and partitions an inside and an outside of the flow path L, and an annular fixing part F that is provided on an outer circumference of the diaphragm D, has a larger thickness than the diaphragm D, and is fixed to the body. The coupling mechanism V4 is formed by, for example, cutting a metal block. Specifically, the diaphragm D is formed by cutting a metal base material into a thin film shape by cutting such as end milling.

The piezo actuator V3 is formed by laminating piezo elements, and is configured such that when a voltage is applied, elongation corresponding to the applied voltage is generated due to a piezoelectric effect. An actuator for driving the valve body V2 in the control valve V is not limited to the piezo actuator V3 and may be an actuator based on another driving principle such as a solenoid.

The control board CB is a computer including a CPU, a memory, an A/D converter, a D/A converter, various input/output devices, and the like, and functions as at least a voltage generation circuit 1 and a valve controller 2 as illustrated in FIG. 3 by execution of a program for a fluid control apparatus stored in the memory and cooperation of various devices.

The voltage generation circuit 1 is configured to output, to the control valve V, a voltage corresponding to a voltage command input from the valve controller 2. More specifically, the voltage generation circuit 1 is a DC-DC converter that outputs a DC voltage output from the valve controller 2 as a DC voltage amplified at a predetermined magnification.

The valve controller 2 controls the control valve V so as to reduce a deviation between a measured amount measured by the fluid sensor and a set amount. In the present embodiment, the valve controller 2 performs feedback control of a flow rate of the control valve V based on a deviation between the measured flow rate measured by the flow rate sensor FS and a set flow rate set by the user. Specifically, the valve controller 2 determines a voltage command to be input to the voltage generation circuit 1 by calculation based on a deviation between the measured flow rate and the set flow rate. Further, the valve controller 2 is configured to first output a voltage command indicating an initial driving voltage and then output a voltage command based on flow rate feedback, for example, in a case where the set flow rate rises from zero to a predetermined value, that is, in a case where the control valve V is changed from a fully closed state to another opening degree. As the initial driving voltage, a voltage corresponding to a change in opening start voltage caused by fatigue occurring in the control valve V is applied.

Specifically, as illustrated in FIG. 3, the valve controller 2 includes a drive history storage unit 21, an initial driving voltage setting unit 22, and a feedback control unit 23.

The drive history storage unit 21 stores therein drive history information of the control valve V. The drive history information is, for example, created based on a voltage change history obtained by monitoring a voltage output from the voltage generation circuit 1 to the control valve V. Alternatively, the drive history information may be created based on a change history of a command value of a voltage command obtained by monitoring the voltage command input to the voltage generation circuit 1. In the present embodiment, the number of times of opening and closing of the control valve V is created as the drive history information based on a change in voltage output from the voltage generation circuit 1. For example, when it is determined that the output voltage has changed from zero at which the control valve V is in the fully closed state to a voltage equal to or higher than a predetermined value and returned to zero again, it is counted that opening and closing has been performed once. By integrating such count values, the number of times of opening and closing is stored in the drive history storage unit 21 as drive history information.

The initial driving voltage setting unit 22 inputs a voltage command for setting the initial driving voltage to be applied to the control valve V to the voltage generation circuit 1 when changing the control valve V from the fully closed state to a predetermined opening degree. A value of the initial driving voltage is set based on the drive history information described above. In the present embodiment, the initial driving voltage is changed according to the number of times of opening and closing of the control valve V, and a voltage smaller than the opening start voltage by a predetermined amount is always set as the initial driving voltage.

Figure 4:
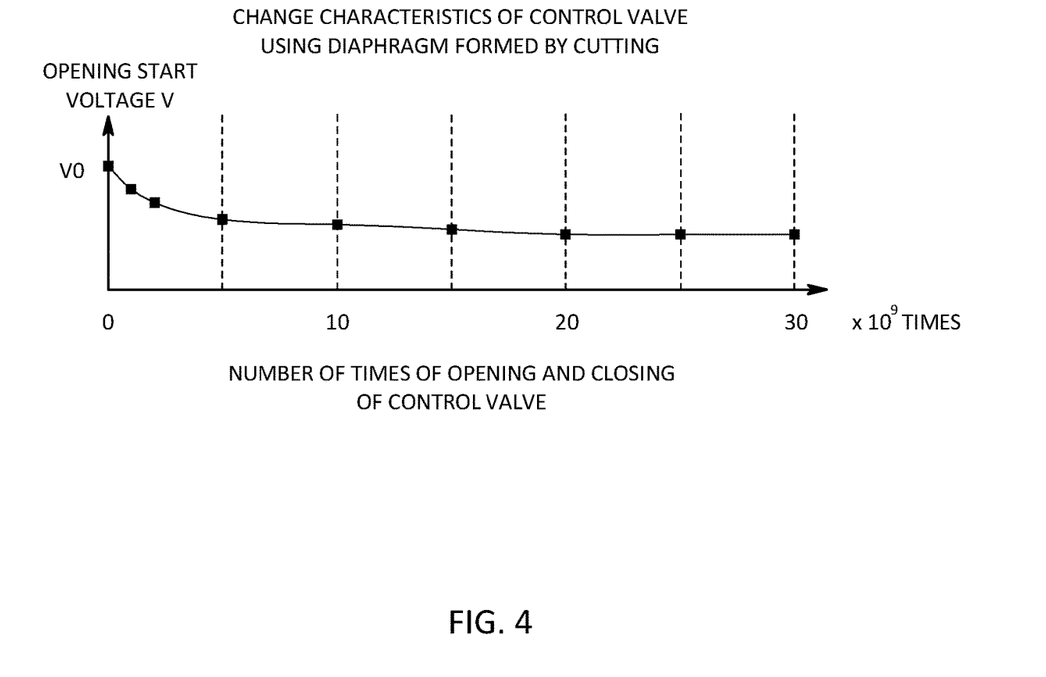
FIG. 4 is a graph illustrating a relationship between the number of times of opening and closing and an opening start voltage in the flow rate control apparatus according to the first embodiment.

Specifically, as illustrated in the graph of FIG. 4, the opening start voltage decreases with respect to an initial value V0 until the opening start voltage reaches a predetermined value as the number of times of opening and closing of the control valve V increases. In the present embodiment, for example, when the number of times of opening and closing becomes 30 million or more, a fatigue limit is reached, and the opening start voltage no longer decreases. In the present embodiment, the initial voltage setting unit stores therein change characteristic data regarding the number of times of driving and the opening start voltage in FIG. 4 obtained by actually performing a fatigue test using a valve of the same type as the control valve V in FIGS. 2 and 3. The change characteristic data may be table format data or may be formula data indicating an approximate curve. The initial voltage setting unit acquires an opening start voltage corresponding to the number of times of opening and closing of the control valve V included in the drive history information from the change characteristic data, and sets a value obtained by multiplying the opening start voltage by a predetermined safety factor as the initial driving voltage.

Figure 5:
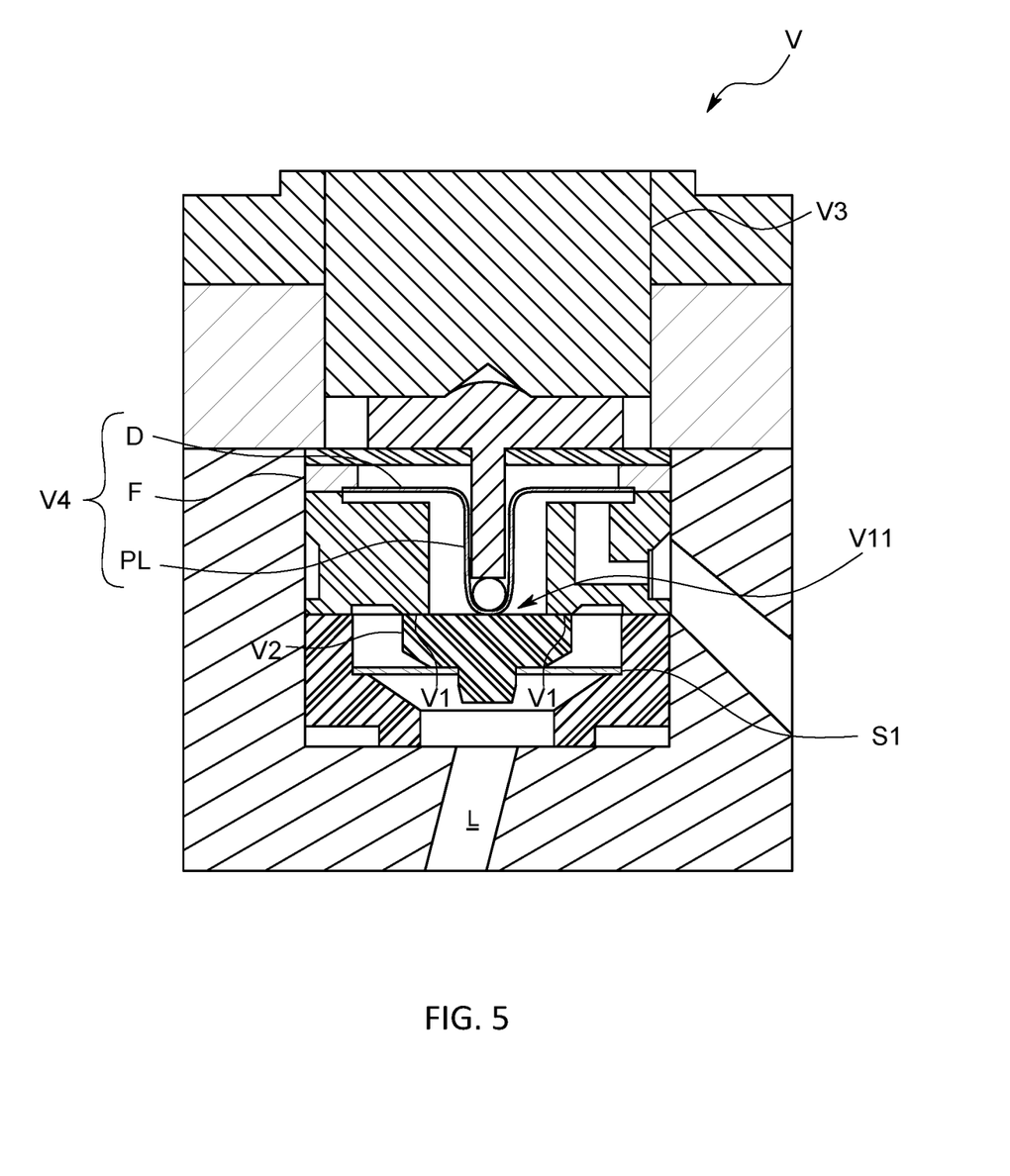
FIG. 5 is a schematic cross-sectional view illustrating a configuration of a control valve using a diaphragm formed by drawing.
Figure 6:
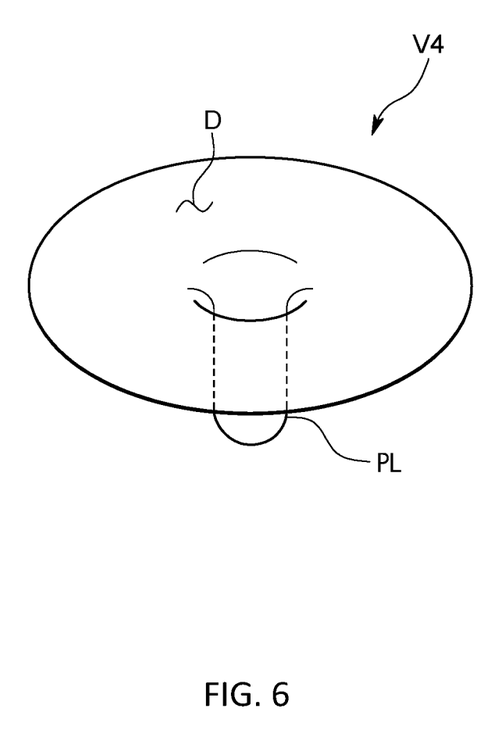
FIG. 6 is a schematic perspective view illustrating the diaphragm formed by drawing.
Figure 7:
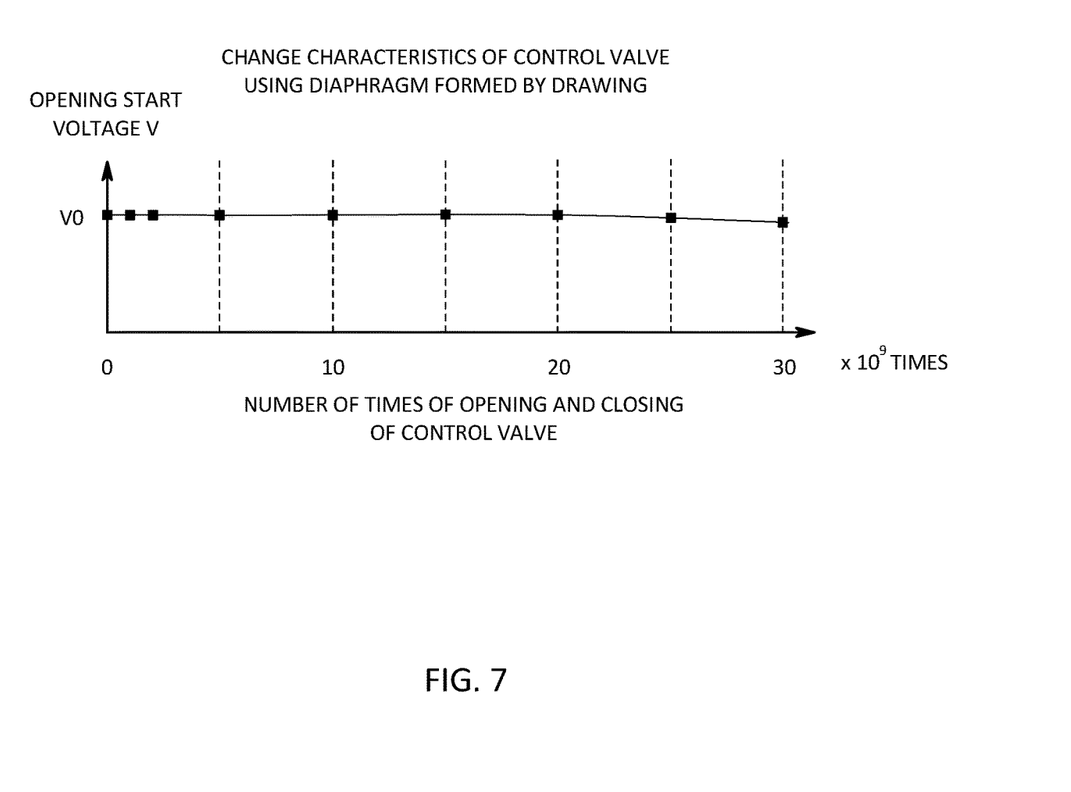
FIG. 7 is a graph illustrating a relationship between the number of times of opening and closing and an opening start voltage in the control valve using the diaphragm formed by drawing.

The change characteristic data of the opening start voltage with respect to the number of times of opening/ and closing is described in detail. As a result of diligent studies, the inventor of the present invention found that an amount of decrease of the opening start voltage varies depending on the type of the diaphragm D that repeatedly undergoes elastic deformation in the control valve V. That is, in the case of the control valve V in which the diaphragm D is formed by drawing as illustrated in FIGS. 5 and 6, an amount of decrease of the opening start voltage is small as compared with the control valve V using the diaphragm D formed by cutting according to the present embodiment even if the number of times of opening and closing increases, as illustrated in the graph of FIG. 7. Therefore, the initial driving voltage setting unit 22 stores therein different change characteristic data for respective methods for processing the diaphragm D of the control valve V to be used and thus sets an initial driving voltage according to the characteristic of the control valve V.

The feedback control unit 23 starts feedback control based on the deviation between the set flow rate and the measured flow rate after the initial driving voltage setting unit 22 outputs a voltage command for setting the initial driving voltage. That is, the feedback control unit 23 performs a PID calculation based on the deviation between the set flow rate and the measured flow rate, and outputs a voltage command corresponding to a result of the PID calculation to the voltage generation circuit 1. Furthermore, the feedback control unit 23 performs control in cases other than a case where the control valve V is changed from the fully closed state to another opening degree.

An operation performed by the fluid control apparatus 100 configured as described above in a case where flow rate control is started from a state in which the control valve V is fully closed will be described with reference to FIGS. 8(*a*) and 8(*b*).

Figure 8A:
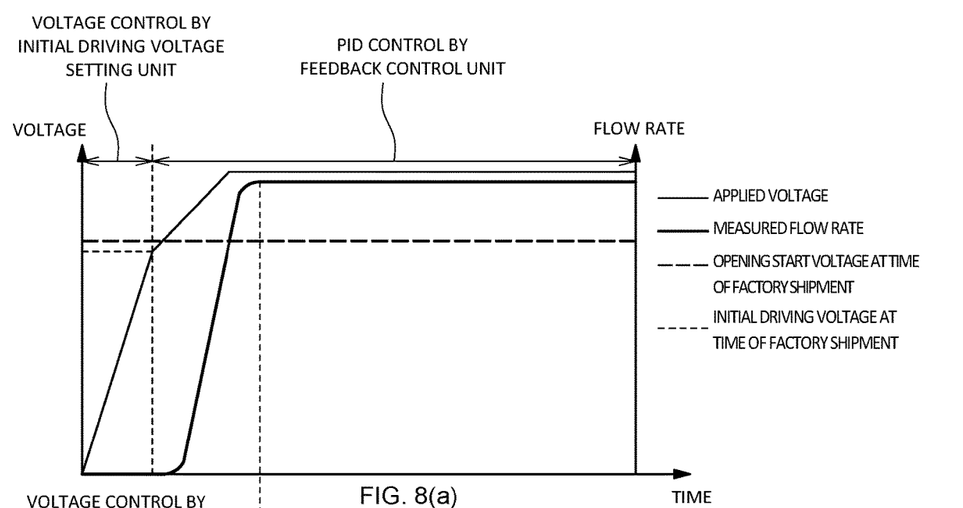
FIGS. 8(a) and 8(b) are graphs illustrating a change in an initial driving voltage and flow rate control characteristics in the flow rate control apparatus according to the first embodiment.
Figure 8B:
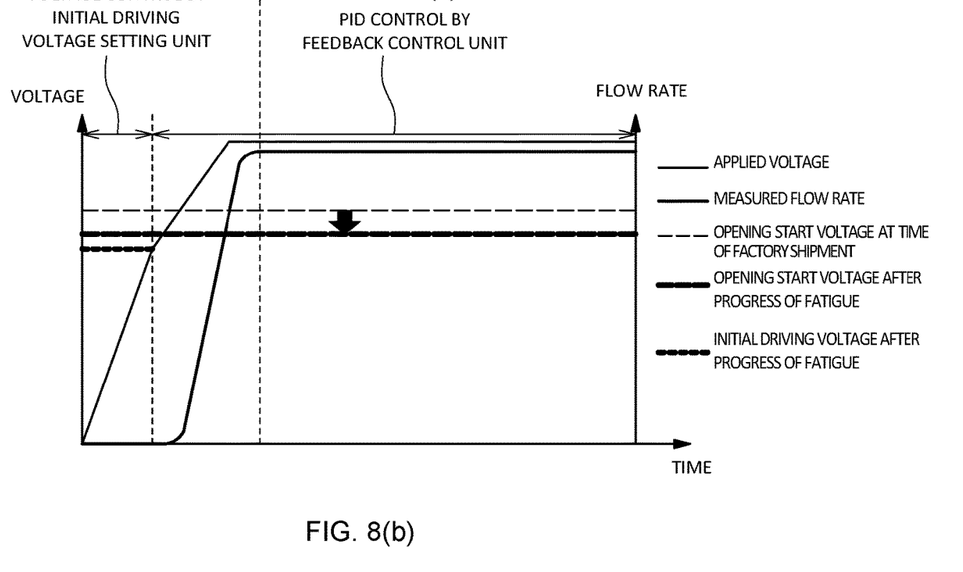

FIG. 8(*a*) is a graph illustrating a step response obtained when a fluid is caused to flow at a maximum flow rate from a fully closed state in the fluid control apparatus 100 at a time of factory shipment. As illustrated in FIG. 8(*a*), when the set flow rate rises from the fully closed state, first, a voltage command is input to the voltage generation circuit 1 by the initial driving voltage setting unit 22 so that an initial driving voltage at the time of factory shipment is output. Since feedback of a measured flow rate is not performed during this period, a voltage applied to the control valve V by the voltage generation circuit 1 rises to the initial driving voltage in a short time. Since the initial driving voltage is set to a value slightly smaller than an opening start voltage at the time of shipment from the factory, the control valve V is not yet opened at a point at which the initial driving voltage is reached, and the fluid does not yet flow into the flow path L.

PID control is started by the feedback control unit 23 when the initial driving voltage output from the voltage generation circuit 1 is reached, and thereafter, the control valve V is feedback-controlled based on a deviation between the set flow rate and the measured flow rate. Since a safety factor is set for the opening start voltage to be smaller than a conventional one, for example, the control valve V is opened and the measured flow rate starts to rise after elapse of several 100 msec from the start of the feedback control. In this way, since the initial driving voltage is set to a value close to the opening start voltage, a rising speed of the flow rate can be made faster than a conventional one.

Furthermore, in the present embodiment, the control valve V is not opened even when the initial driving voltage is applied to the control valve V, and the valve is opened when the applied voltage slightly increases by the PID control. Therefore, the measured flow rate can be stabilized at the set flow rate without large overshoot with respect to the set flow rate.

Next, flow rate control performed in a state where the number of times of opening and closing of the control valve V exceeds a predetermined number of times and fatigue of the diaphragm D of the control valve V has progressed will be described with reference to FIG. 8(*b*).

The initial driving voltage setting unit 22 acquires an opening start voltage after the progress of fatigue that is lower than the opening start voltage at the time of factory shipment based on the drive history information and the change characteristic data. Then, the initial driving voltage setting unit 22 sets a new initial driving voltage after the progress of fatigue based on the opening start voltage after the progress of fatigue. As illustrated in FIG. 8(b), the initial driving voltage is lowered in accordance with the lowered opening start voltage, and it is possible to realize almost the same responsiveness regarding a rise of the voltage and a rise of the measured flow rate as that at the time of factory shipment. Since the change in the initial driving voltage in FIG. 8(b) is described by using a state after elapse of a predetermined period from the factory shipment, the initial driving voltage is sequentially changed until a fatigue limit is reached. After the fatigue limit is exceeded, the initial driving voltage is fixed to a constant value.

As described above, since the fluid control apparatus 100 according to the first embodiment holds the drive history information of the control valve V, the initial driving voltage can be changed in accordance with a change in the opening start voltage caused by progress of fatigue of the control valve V. Therefore, a relationship between the opening start voltage and the initial driving voltage can be kept constant regardless of a change in the state of the control valve V. Therefore, responsiveness of the flow rate control at the time of factory shipment can be kept substantially the same. Specifically, it is possible to always maintain control performance such that a large overshoot is prevented from occurring with respect to a terminal value of the set flow rate while keeping a time required for a rise of the flow rate within a predetermined time.

Since response characteristics in a case where a flow rate rises from a fully closed state can be kept substantially constant regardless of the number of times of opening and closing of the control valve V as described above, accuracy of a flow rate of a supplied fluid can be kept over a long period of time, for example, even in a case where the flow rate is pulse-controlled by switching on and off the control valve V at a high speed as in an atomic layer deposition (ALD) process or the like.

Next, a fluid control apparatus 100 according to a second embodiment of the present invention will be described. Parts corresponding to those described in the first embodiment are given identical reference signs.

In the fluid control apparatus 100 according to the second embodiment, an initial driving voltage is changed based on not only the number of times of opening and closing of a control valve V but also a usage environment temperature which is a temperature of a fluid and an ambient temperature measured in the fluid control apparatus 100. For example, when a temperature of the fluid rises, a control valve V becomes harder to open due to influence of thermal expansion and the like in a valve body V2 and a valve seat V1 that constitute the control valve V, and an opening start voltage rises. A valve controller 2 according to the second embodiment is configured such that an initial driving voltage is set in accordance with such a change in the opening start voltage caused by a temperature rise.

Figure 9:
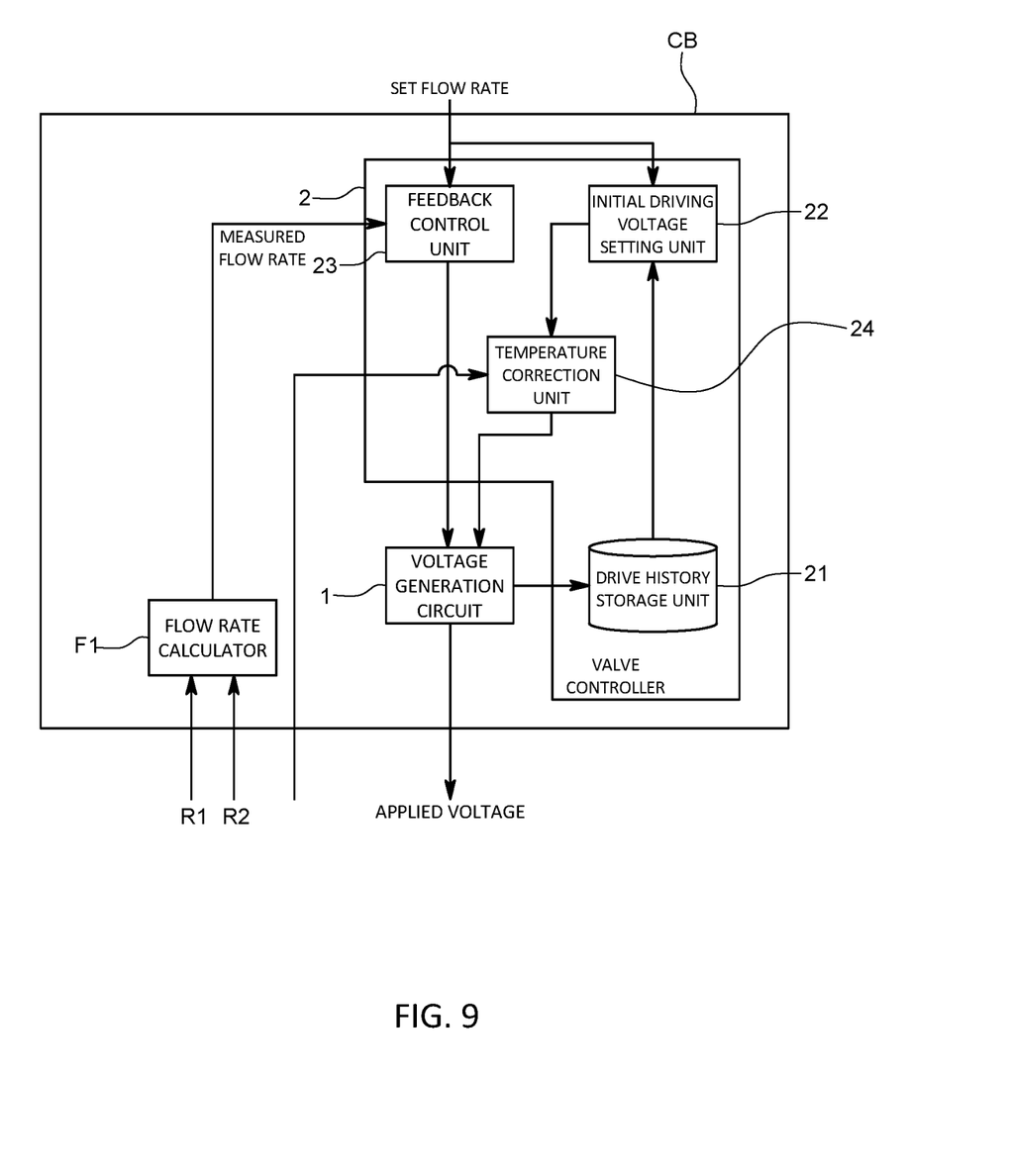
FIG. 9 is a functional block diagram of a flow rate control apparatus according to a second embodiment of the present invention.

Specifically, as illustrated in FIG. 9, the valve controller 2 further includes a temperature correction unit 24 that corrects the initial driving voltage set by an initial driving voltage setting unit 22 in accordance with a usage environment temperature.

For example, the temperature correction unit 24 corrects a voltage command output from the initial driving voltage setting unit 22 in accordance with the usage environment temperature, and inputs the corrected voltage command to a voltage generation circuit 1. In the present embodiment, the opening start voltage increases as the usage environment temperature increases, and therefore the temperature correction unit 24 performs correction so that the initial driving voltage also increases as the usage environment temperature increases.

As described above, according to the fluid control apparatus 100 according to the second embodiment, the initial driving voltage can be changed in accordance with not only a change in the opening start voltage based on the number of times of opening and closing of the control valve V but also a change in the opening start voltage caused by a change in the usage environment temperature. Therefore, even when there is a temperature change in the fluid control apparatus 100, a response speed at which an opening degree of the control valve V changes from a fully closed state can be kept constant.

Next, a fluid control apparatus 100 according to a third embodiment will be described. Parts corresponding to those described in the first embodiment are given identical reference signs.

In the fluid control apparatus 100 according to the third embodiment, a control valve V is a normally open control valve that is in a fully opened state in a state where no voltage is applied, and is configured to be able to cope with a change in applied voltage necessary for achieving a fully closed state caused by a change in usage environment temperature. Specifically, as a result of studies, the present inventor found that a voltage required to fully close the normally open control valve V increases as the usage environment temperature increases. In view of this, a voltage generation circuit 1 of the fluid control apparatus 100 according to the third embodiment is configured to increase an upper limit voltage that can be output as the usage environment temperature increases.

Figure 10:
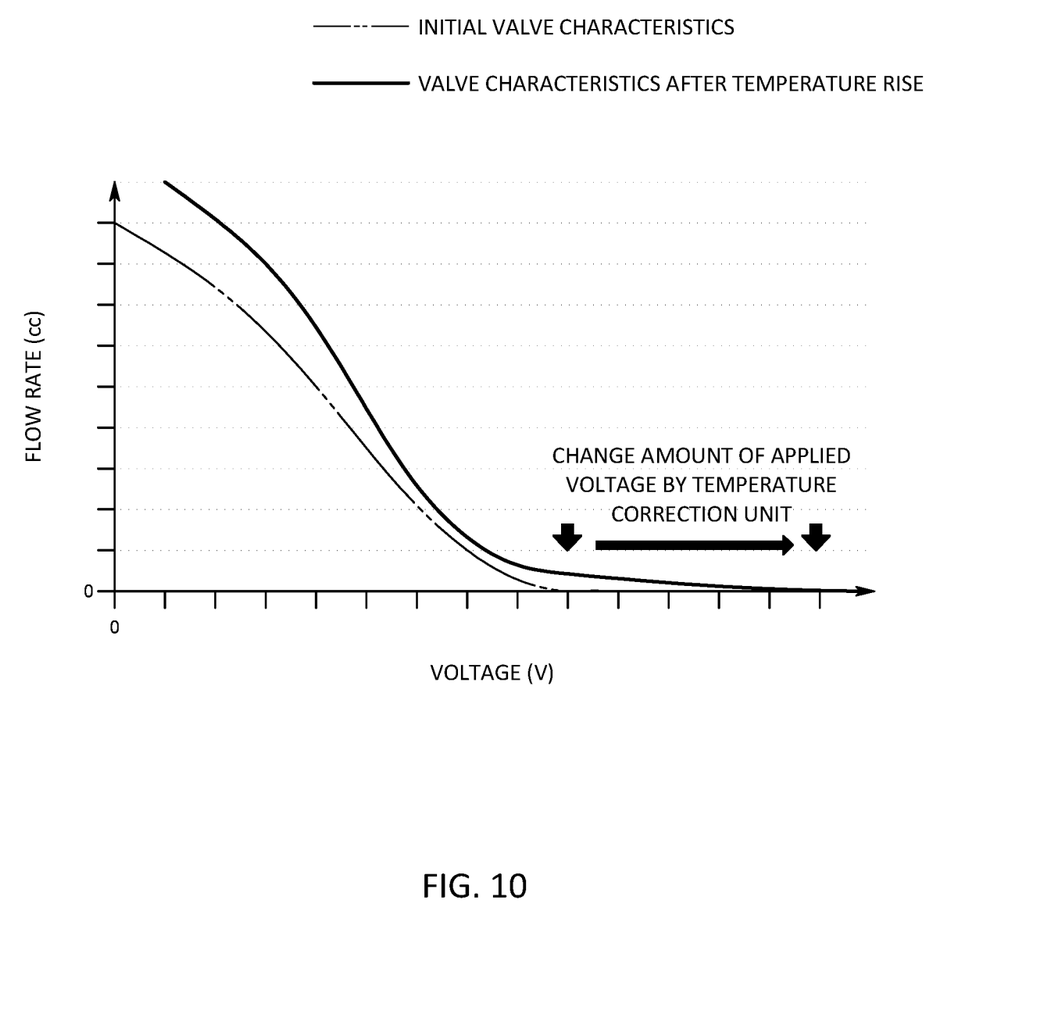
FIG. 10 is a graph illustrating valve characteristics in a flow rate control apparatus according to a third embodiment of the present invention.

In the fluid control apparatus 100 according to the third embodiment configured as described above, the upper limit of the voltage output from the voltage generation circuit 1 is changed in accordance with the temperature, and therefore a voltage higher than a voltage at which the control valve V can be fully closed in the initial state is output as illustrated in the graph of FIG. 10, and the normally open control valve V can be fully closed state with certainty to realize 0 flow rate.

Other embodiments will be described below.

Although a flow rate of a fluid is controlled in the above embodiments, a pressure of the flow rate may be controlled in the present invention. The fluid may be a gas, a liquid, or a mixture thereof.

Although a change in opening start voltage in a control valve is estimated based on the number of times of opening and closing of the control valve in the above embodiment, this is not restrictive. For example, the drive history information may include a driving time instead of the number of times of opening and closing the control valve. The initial driving voltage setting unit may estimate the number of times of opening and closing from the driving time and indirectly estimate the opening start voltage. Alternatively, the drive history information may include various kinds of information on a drive history of the control valve such as the number of times of opening and closing and a driving time. Furthermore, a method for counting the number of times of opening and closing is not limited to that described in the above embodiments. The number of times of setting from zero to a value other than zero by the set amount of the user may be counted as the number of times of opening and closing.

Even in a normally closed control valve, tendency of a change in opening start voltage with respect to the number of times of opening and closing may be different from that in the above embodiments depending on a difference in configurations of a valve body, a valve seat, a diaphragm, and the like. Therefore, the initial driving voltage need just be set as appropriate according to change characteristics of the opening start voltage. Specifically, in a case where the opening start voltage is large relative to the number of times of opening and closing, the initial driving voltage need just be increased accordingly.

The present invention may be applied not only to a normally closed control valve but also to a normally open control valve. Also in this case, the initial driving voltage setting unit need just be configured to change a value of the initial driving voltage in accordance with the drive history information.

In the embodiment, the control board is configured to realize the function as the drive history storage unit, but this function may be realized in a computer separate from the control board and connected by a wired or wireless network. That is, the fluid control apparatus is not limited to one in which all components are gathered at one place, and is a concept encompassing one in which a part of a calculation function or the like is realized by a computer or the like provided at a place away from a place where a control valve and a fluid sensor are provided.

Furthermore, various modifications of the embodiments and combinations of parts of the embodiments may be made without departing from the spirit of the present invention.

DESCRIPTION OF REFERENCE CHARACTERS

100: fluid control apparatus
V: control valve
D: diaphragm
1: voltage generation circuit
2: valve controller
21: drive history storage unit
22: initial driving voltage setting unit
23: feedback control unit

What is claimed is:

1. A fluid control apparatus comprising:
   a control valve that is provided on a flow path and whose opening degree is changed in accordance with an applied voltage;
   a fluid sensor that measures a flow rate or a pressure of a fluid flowing through the flow path;
   a voltage generation circuit that outputs a voltage according to an input voltage command to the control valve; and
   a valve controller that controls the control valve so as to reduce a deviation between a measured amount measured by the fluid sensor and a set amount, wherein
   the valve controller includes:
     an initial driving voltage setting unit that inputs a voltage command for setting an initial driving voltage to be applied to the control valve to the voltage generation circuit in a case where the control valve is changed from a fully closed state to a predetermined opening degree; and
     a drive history storage unit that stores therein drive history information of the control valve,
   the initial driving voltage setting unit changes a value of the initial driving voltage in accordance with the drive history information,
   the control valve is one of a normally closed valve that is in a fully closed state in a state where no voltage is applied or a normally open valve that is in a fully open state in a state where no voltage is applied,
   the drive history information includes the number of times of opening and closing of the control valve, and
   the initial driving voltage setting unit is configured to change the value of the initial driving voltage in accordance with the number of times of opening and closing of the control valve.

2. The fluid control apparatus according to claim 1, wherein
   the initial driving voltage setting unit is configured to lower the initial driving voltage in accordance with the number of times of opening and closing of the control valve.

3. The fluid control apparatus according to claim 1, wherein
   when the number of times of opening and closing of the control valve is a predetermined value or more, the initial driving voltage setting unit sets the initial driving voltage to a predetermined fixed value.

4. The fluid control apparatus according to claim 1, wherein
   the initial driving voltage is set to a value lower than an opening start voltage at which the control valve starts to open from the fully closed state.

5. The fluid control apparatus according to claim 1, wherein
   the initial driving voltage setting unit is configured to increase the initial driving voltage in accordance with the number of times of opening and closing of the control valve.

6. The fluid control apparatus according to claim 1, wherein
   the control valve includes a diaphragm formed by either cutting or drawing; and
   the initial driving voltage setting unit varies a change amount of the initial driving voltage with respect to the number of times of opening and closing in accordance with a processing method used to form the diaphragm.

7. The fluid control apparatus according to claim 1, wherein
   the valve controller further includes:
     a feedback control unit that calculates a voltage command to be input to the voltage generation circuit based on a deviation between the set amount and the measured amount; and
     the voltage command calculated by the feedback control unit is input to the voltage generation circuit after the initial driving voltage is input to the control valve.

8. The fluid control apparatus according to claim 1, wherein
   the control valve is configured such that an upper limit value of a voltage that can be output is changed in accordance with a usage environment temperature of the control valve.

9. The fluid control apparatus according to claim 1, wherein
   the valve controller further includes a temperature correction unit that corrects the initial driving voltage in accordance with a usage environment temperature of the control valve.

10. A method for controlling a fluid control apparatus including a control valve that is provided on a flow path and whose opening degree is changed in accordance with an applied voltage, a fluid sensor that measures a flow rate or a pressure of a fluid flowing through the flow path, and a voltage generation circuit that outputs a voltage according to an input voltage command to the control valve, the method comprising:
- controlling the control valve so as to reduce a deviation between a measured amount measured by the fluid sensor and a set amount by outputting a voltage to the control valve; and
- inputting a voltage command for setting an initial driving voltage to be applied to the control valve to the voltage generation circuit in a case where the control valve is changed from a fully closed state to a predetermined opening degree, wherein
- the control valve is one of a normally closed valve that is in a fully closed state in a state where no voltage is applied or a normally open valve that is in a fully open state in a state where no voltage is applied,
- the drive history information includes the number of times of opening and closing of the control valve, and
- a value of the initial driving voltage is changed in accordance with drive history information of the control valve.

11. A program recording medium in which a program used for a fluid control apparatus is recorded, the fluid control apparatus including:
- a control valve that is provided on a flow path and whose opening degree is changed in accordance with an applied voltage;
- a fluid sensor that measures a flow rate or a pressure of a fluid flowing through the flow path; and
- a voltage generation circuit that outputs a voltage according to an input voltage command to the control valve, wherein
- the program causes a computer to function as a valve controller that controls the control valve so as to reduce a deviation between a measured amount measured by the fluid sensor and a set amount,
- the valve controller includes an initial driving voltage setting unit that inputs a voltage command for setting an initial driving voltage to be applied to the control valve to the voltage generation circuit in a case where the control valve is changed from a fully closed state to a predetermined opening degree, and a drive history storage unit that stores therein drive history information of the control valve,
- the control valve is one of a normally closed valve that is in a fully closed state in a state where no voltage is applied or a normally open valve that is in a fully open state in a state where no voltage is applied,
- the drive history information includes the number of times of opening and closing of the control valve,
- the initial driving voltage setting unit changes a value of the initial driving voltage in accordance with the drive history information.

* * * * *